United States Patent [19]

Thompson et al.

[11] Patent Number: 4,707,646
[45] Date of Patent: Nov. 17, 1987

[54] METHOD OF LIMITING MOTOR POWER OUTPUT

[75] Inventors: Kevin D. Thompson; Gary W. Ballard, both of Indianapolis, Ind.

[73] Assignee: Carrier Corporation, Syracuse, N.Y.

[21] Appl. No.: 868,378

[22] Filed: May 29, 1986

[51] Int. Cl.⁴ .................. G05B 5/00; H02K 17/34
[52] U.S. Cl. .................. 318/332; 318/434; 318/335
[58] Field of Search ............ 318/432, 434, 332, 481, 318/335; 364/153, 511; 236/35, DIG. 9; 373/60; 417/20, 22, 1, 43

[56] References Cited

U.S. PATENT DOCUMENTS

| | | | |
|---|---|---|---|
| 4,102,604 | 7/1978 | Rutshtein | 417/22 |
| 4,177,649 | 12/1979 | Venema | 417/43 |
| 4,248,194 | 2/1981 | Drutchas | 417/20 |
| 4,279,013 | 7/1981 | Cameron | 364/153 |
| 4,317,176 | 2/1982 | Saar | 318/332 |
| 4,513,381 | 4/1985 | Houser | 318/332 |
| 4,526,513 | 7/1985 | Bogel | 417/43 |
| 4,628,233 | 12/1986 | Bradus | 318/332 |

Primary Examiner—William M. Shoop, Jr.
Assistant Examiner—Patrick C. Keane
Attorney, Agent, or Firm—Dana F. Bigelow

[57] ABSTRACT

The power output of a variable speed motor is limited to a safe level by determining the maximum allowable speed corresponding to a maximum power output limit over a range of load conditions and then maintaining the speed of the motor below those maximum allowable speeds at the particular load conditions existing at the time.

7 Claims, 4 Drawing Figures

METHOD OF LIMITING MOTOR POWER OUTPUT

BACKGROUND OF THE INVENTION

This invention relates generally to the control of motors and, more particularly, to a method of limiting to a safe level the power output of a variable speed motor operating under variable load conditions.

The use of variable speed motors is now being made for various applications. In order to vary the speeds as desired, various control techniques have been employed. One approach is that of pulse width modulation wherein the voltage is controlled by varying the duration and/or width of the output pulses. Pulse width modulation can be used, for example, with inverter controls or with electrically commutated motors (ECM's).

In the application of motor controls, it is common to limit the speed of the motor to a safe operating level as determined by the particular design specifications. Even when operating within this limit, a motor or its associated electronics may become overstressed if its power output exceeds a certain level for a given load on the motor. For example, where a motor is used to drive a fan for the circulation of air from a furnace, the speed of the motor is controlled such that the power output will not normally exceed a safe level. However, where a high volume of air delivery is called for under non-standard conditions such as static pressures in excess of 0.5 inches of water, the associated higher torque requirements may cause the safe power output level to be exceeded. This may occur, for example, where the air filter becomes dirty or the ductwork is overly restrictive because of improper sizing or because of too many dampers being closed off.

In Patent Application Ser. No. 809,466, filed Dec. 16, 1985 by the common assignee of the present invention, incorporated herein by reference a technique is described for calibrating a variable speed motor. As part of this technique, a motor fan combination is tested to empirically determine the relationship between the speed of the motor and the volume flow of air being delivered by the fan. This relationship is then used, in combination with the fan law equations and a measured torque output of the motor, to calculate the desired motor speed to obtain a desired air delivery volume. However, such a motor and control system is susceptible to the problem mentioned above relating to excessive power conditions.

It is therefore an object of the present invention to provide a means of protecting a variable speed motor from exceeding a safe level of power output.

Another object of the present invention is the provision for controlling the power output of a variable speed motor to which an unusually high load may be applied.

Yet another object of the present invention is the provision for controlling the output of a variable speed motor without the use of special equipment and apparatus.

Still another object of the present invention is the provision for an improved motor control system that is economical to manufacture and effective in use.

These objects and other features and advantages become more readily apparent upon reference to the following description when taken in conjunction with the appended drawings.

SUMMARY OF THE INVENTION

Briefly, in accordance with one aspect of the invention, a motor fan combination is empirically tested to determine the relationship between the motor speed and the volume flow of air. The motor is then operated at maximum power over a range of static pressure conditions, while the corresponding volume flow, motor speed, and motor power output are recorded. A maximum power output limit is established, and, using the fan laws, maximum allowable motor speeds are calculated over the range of static pressure conditions. The actual motor speed is then limited to these maximum allowable motor speeds during all periods of operation.

In accordance with another aspect of the invention, again using the fan laws, reference speeds are determined, as a function of motor speeds and volume flow, over the range of the static load conditions. These reference speeds are then related to the maximum allowable motor speeds to derive a representative equation wherein the maximum allowable motor speed is expressed as a function of the reference speeds. A microprocessor then uses the equation to compute the maximum allowable motor speed for the existing static load conditions, and to limit the actual speed of the motor to those values.

In the drawings as hereinafter described, a preferred embodiment is depicted; however, various other modifications in alternate constructions can be made thereto without departing from the true spirit and scope of the invention.

DESCRIPTION OF THE PREFERRED EMBODIMENT

Figure 1:
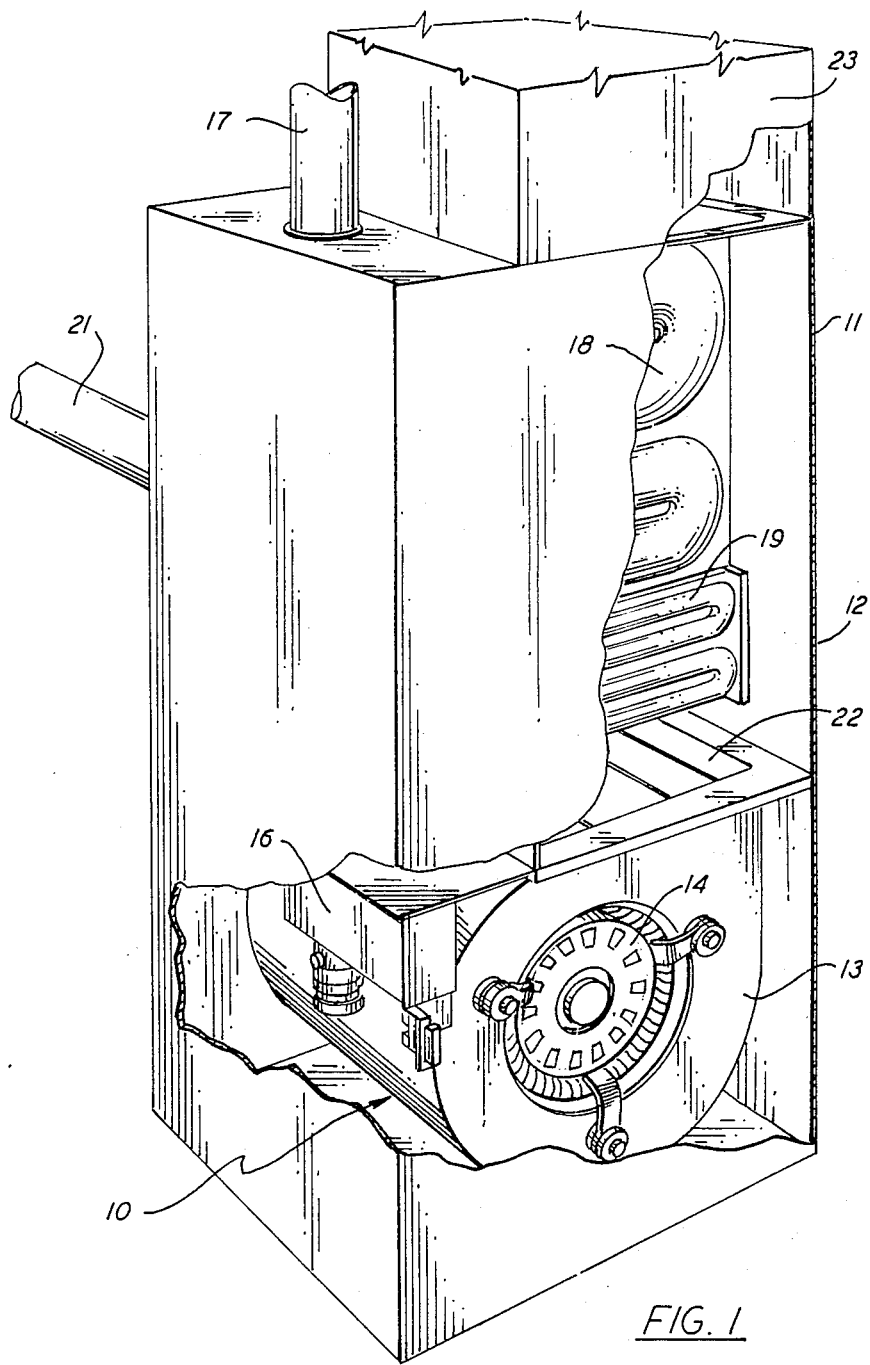
FIG. 1 is a perspective view, partially broken away, of a furnace having an installed motor and control system in accordance with the present invention.

Referring now to FIG. 1, there is shown generally at 10, a motor control system as applied to a furnace 11 in accordance with the design of the present invention. The furnace 11 includes a cabinet 12 which houses in its lower portion a blower 13, a motor 14 for driving the blower 13 and a control apparatus 16 which is electrically connected to the motor and various other devices to provide the necessary control and coordination between the various components of the system. One of the functions performed by the control 16 is that of controlling the speed of the motor 14 such that the blower 13 provides the desired volume flow of air through the furnace.

The furnace 11 includes an intake vent 17 which brings in outdoor air for combustion, and a burner (not shown) where the fuel-air mixture is burned. The resulting hot combustion gases are then drawn through a primary heat exchanger 18 and a condensing heat exchanger 19, with the exhaust gases then flowing out the exhaust vent 21. At the same time, the cool household air is being brought back to the furnace by the blower 13 and then recirculated upwardly through the fan discharge opening 22 and across the outer surfaces of the condensing heat exchanger 19 and the primary heat exchanger 18 where it is heated on its way to the duct 23 for distribution throughout the house.

Figure 2:
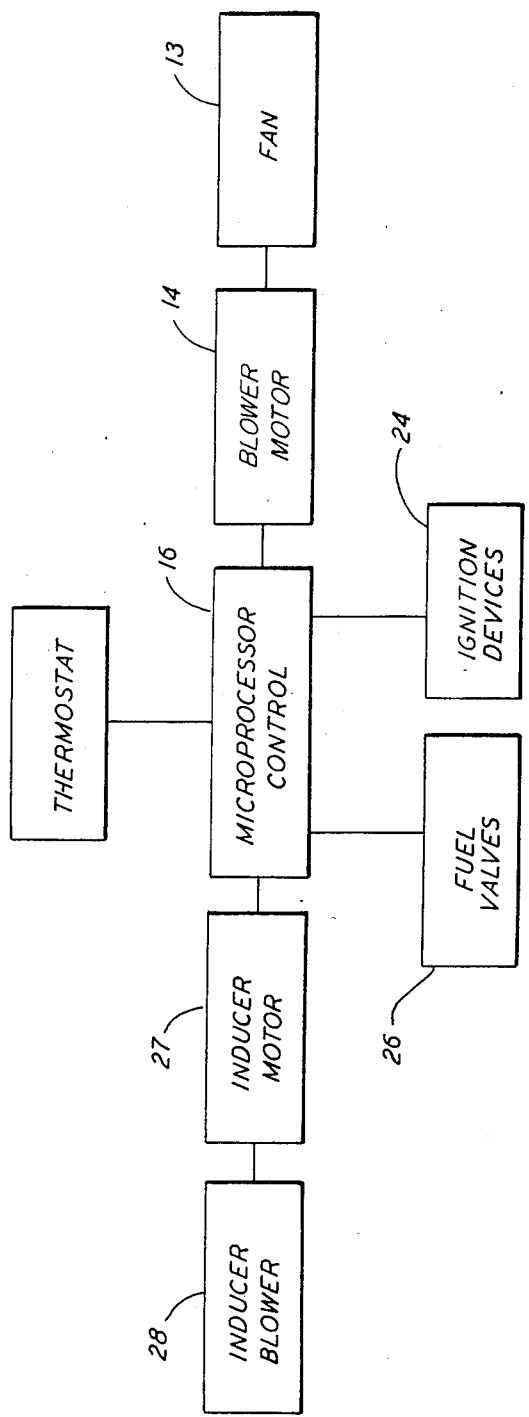
FIG. 2 is a schematic illustration of the motor and control portion of the present invention.

In addition to controlling the blower motor 14, the control 16 functions to regulate and coordinate the operation of a draft inducer blower, the flow of fuel to the burners, and the operation of the pilot and primary ignition devices. In FIG. 2, there is shown a schematic illustration of the microprocessor control 16 with its electrical interconnections with the fan motor 14 and with the other devices which it controls. Typically the ignition devices 24 include a pilot which, after being proved, sends a signal to the microprocessor control 16 which then opens the fuel valves 27 to send fuel to the burners. In order to provide for the proper mixture of air to the burners, the microprocessor control 16 also turns on the inducer motor 27 to drive the inducer blower 28, which then causes air to flow from the air inlet 17 into the burner to mix with the fuel in the desired proportions. After ignition has occurred in the burners, and hot exhaust gases have been drawn into the heat exchangers to heat up their outer surfaces, the microprocessor control 16 turns on the fan motor 14 to drive the fan 13 for circulating the hot air throughout the house. When the house is heated to the point that the thermostat 29 is satisfied, then a signal is sent to the microprocessor control 16 to de-energize, in a sequential and controlled fashion, the fuel valves 26, the ignition devices 24, the inducer motor 27 and the fan motor 14.

Figure 3:
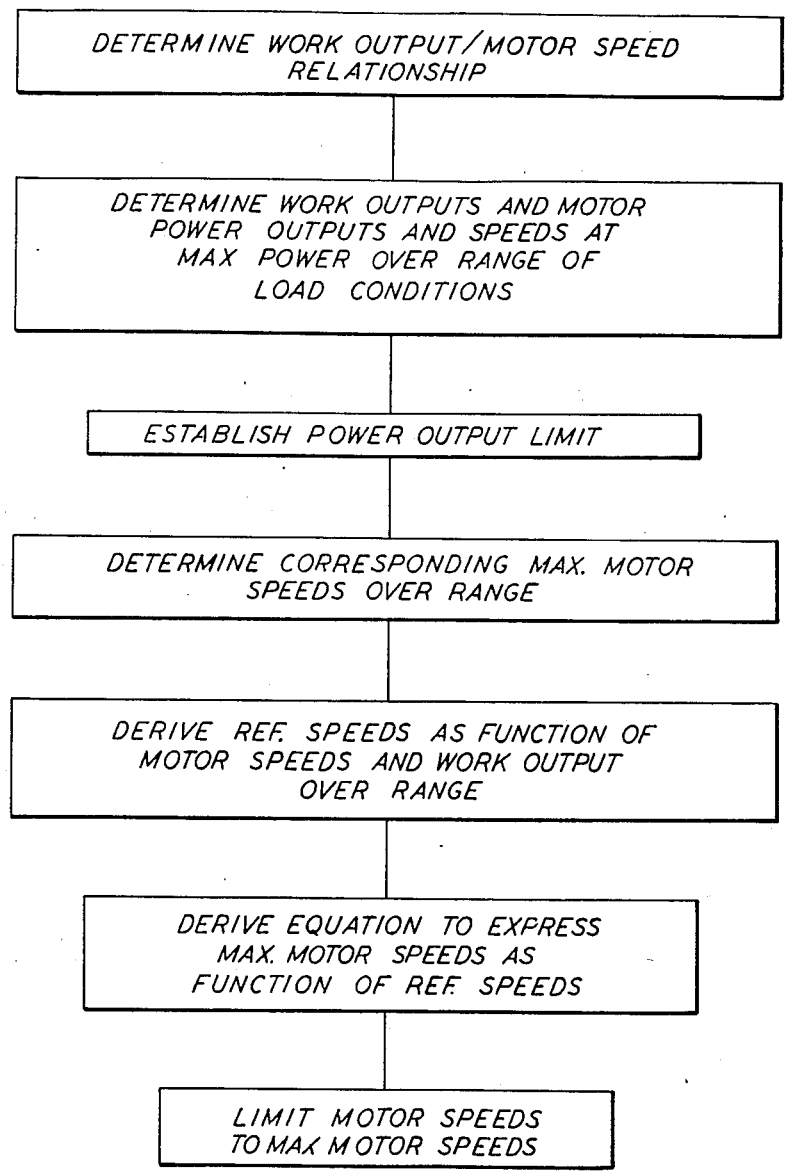
FIG. 3 is a schematic illustration of the process of controlling a motor in accordance with the present invention.

The motor 14 is of the variable speed type such that its speed can be controlled so as to maintain the desired air delivery for a particular air temperature rise or cooling load desired. One such motor is an electronically commutated motor which is commercially available from General Electric as Part Number 5SME39HGH6-9IT. However, it will be understood that other variable speed motor and control combinations, such as, for example, any AC motor and inverter combination, could be used in practicing the present invention. Similarly, although the present invention is being described herein as applied to a motor which drives a furnace blower fan, it will be recognized that the invention can be used with other variable load applications as well. Referring now to FIG. 3, the various steps in the inventive process are set forth, with the particular sequence as shown being exemplary and not necessarily required to be performed in that order. Further, although it will be recognized that some of the steps are set forth in specific terms, it will be understood that their function as set forth in the claims may be accomplished by other specific means while still remaining within the scope of the invention.

In order to establish the output of the fan 13 when the motor is operating at maximum power conditions, laboratory tests were conducted with the motor mentioned hereinabove as driving a Morrison blower wheel manufactured by Morrision Products Inc. of Cleveland, Ohio and available as a commercial product as Part No. 10-7DD03-42007-0.

These laboratory tests were necessary to determine, for the motor-blower assembly, the air flow rate of the blower (CFM), and the power outputs (HP) and speeds (RPM) of the motor operating at maximum power conditions over a range of load conditions. It should be mentioned here that the present invention can be used in variable speed applications other than in driving fans, in which case the measurements to be made are not air flow (CFM) but some other form of work output. Accordingly, where CFM is used hereinafter it should be construed in the narrow sense only to the extent it is being applied to the blower assembly described, but in a broader sense to mean work output of a system being controlled by the present invention.

To obtain the desired values mentioned above, the assembly is run at maximum power under conditions with static pressure varying from 0.1 to 0.7 inches W.C. The results are set forth in the following table:

TABLE 1

| STATIC PRESSURE (IN. W.C.) | HP (WATTS) | RPM | TEST CFM |
|---|---|---|---|
| .1 | 421 | 924 | 1413 |
| .2 | 431 | 958 | 1380 |
| .3 | 439 | 992 | 1343 |
| .4 | 447 | 1026 | 1304 |
| .5 | 457 | 1059 | 1269 |
| .6 | 465 | 1091 | 1242 |
| .7 | 475 | 1128 | 1214 |

Since it is under high load conditions (i.e., high motor RPM under high static pressure conditions) that the power limit may be exceeded, it is necessary to choose an associated design point that represents the limit on the power output of the motor. An analysis of the data in Table 1 shows that a safe power limit for the particular motor/blower combination mentioned hereinabove would be 457 watts, which corresponds to 1059 RPM and 1269 CFM.

Using the data from Table 1, it is then necessary to calculate, at the various systematic pressures, an equivalent reference motor speed ($RPM_{ref}$) which would occur during a "coast down" measurement, as conducted in accordance with U.S. application Ser. No. 809,466 referenced hereinabove and as illustrated in the following equation which has been derived empirically by operating the above-mentioned motor and blower wheel assembly to obtain the relationship between the motor speed and the fan output:

$$CFM_{ref} = 865.893 - (0.74539 \times RPM_{ref}) \qquad \text{(Eq. 1)}$$

Where:
$CFM_{ref}$ is the reference air volume flow rate expressed in cubic feet per minute and
$RPM_{ref}$ is the reference motor speed in revolutions per minute.

Using the empirical relationship set forth in Equation 1 and the following fan law equation:

$$\frac{RPM}{RPM_{ref}} = \frac{CFM}{CFM_{ref}} \qquad \text{(Eq. 2)}$$

A reference motor speed $RPM_{ref}$ is found to be:

$$RPM_{ref} = \frac{865.893 \times RPM}{CFM + (.74539 \times RPM)} \qquad \text{(Eq. 3)}$$

Using the RPM and CFM values of Table 1, Equation 3 is then used to obtain the $RPM_{ref}$ values as set forth in column 2 of Table 2 and are used as a reference in determining system load conditions to thereby obtain the corresponding maximum allowable RPM ($RPM_{457}$).

These values as shown in column 3 of Table 2 are obtained using the following fan law equation:

$$\frac{(RPM_{457})^3}{RPM} = \frac{HP_{max}}{HP} \quad (Eq.\ 4)$$

rearranging:

$$RPM_{457} = RPM \times \frac{(HP_{max})^{\frac{1}{3}}}{HP} \quad (Eq.\ 5)$$

Where:
$RPM_{457}$ is the motor speed at which the power input will be 457 watts.
$HP_{max}$ is 457 watts and
RPM and HP are the respective values from Table 1.

TABLE 2

| STATIC PRESSURE (IN. W.C.) | $RPM_{ref}$ (EQ. 3) | $RPM_{457}$ (EQ. 5) |
|---|---|---|
| .1 | 380.7 | 949.6 |
| .2 | 396.1 | 976.9 |
| .3 | 412.5 | 1005.4 |
| .4 | 429.4 | 1033.6 |
| .5 | 445.5 | 1059.0 |
| .6 | 459.6 | 1084.7 |
| .7 | 475.3 | 1113.6 |

Thus, by limiting the speed of the motor to the indicated $RPM_{457}$ value corresponding to the particular system operating condition, the power output of the motor can be limited to 457 watts to thereby protect the motor and its electronic components from damage that may otherwise occur. Such an application, requires no means for sensing the static pressure condition but rather uses the calculated $RPM_{ref}$ which has been obtained in the coast down technique. Since these are discrete values between which it would be necessary to interpolate, an empirical relationship is derived to provide for control over a continuous range of $RPM_{ref}$ values.

Assuming a straight line relationship ($y = mx + b$) between $RPM_{ref}$ and $RPM_{max}$, and designating $RPM_{457}$ as $RPM_{max}$ we obtain the following equation:

$$RPM_{max} = 297.18 + (1.715 \times RPM_{ref}) \quad (Eq.\ 6)$$

In applying Equation 6, the $RPM_{ref}$ is obtained at the beginning of each heating cycle when performing the calibration technique set forth in U.S. patent application Ser. No. 809,466 referenced hereinabove. Thus, when the system goes through a coast down measurement of the system load and computes the desired RPM to obtain the desired CFM of air delivery, it can now compare the desired RPM and limit it to $RPM_{max}$ to prevent the motor from being overstressed. Further, whenever the desired RPM is greater than $RPM_{max}$, it may be desirable to cause some type of fault signal to be displayed to thereby indicate that a load condition exists which is causing the power limiting feature to be brought into play. The operator can then check for such things as blocked filters or closed dampers to remove the excessive load condition.

Figure 4:
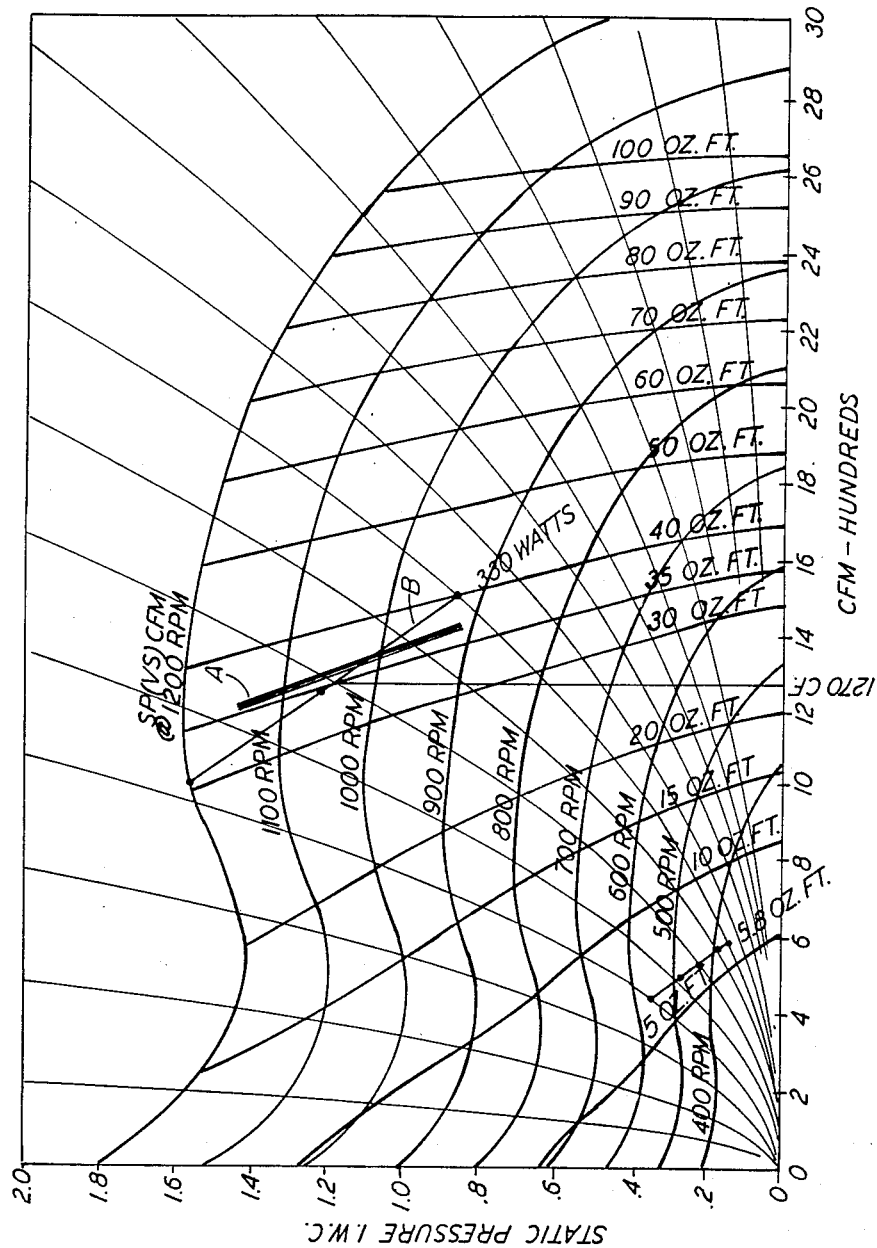
FIG. 4 is a graphic illustration, of how the motor operating conditions are controlled in accordance with the present invention.

Referring now to FIG. 4, the principles discussed hereinabove are illustrated on a blower performance graph. In that graph line A is a maximum power line representing those values in Table 1 wherein the system was run at maximum power conditions. Line B is a constant power line representing those values in Table 2, column 3, wherein the system was run at a constant power output level of 330 watts (i.e. 457 watts of input power). The use of Equation 6 allows one to recognize the crossing point of these two lines and, where the desired RPM is less than the $RPM_{max}$, the system will be allowed to operate within the confines of line A. But if the desired RPM is greater than the $RPM_{max}$ the system will rather be made to operate on line B.

It should be understood that the control method and apparatus of the present invention can be used to control any variable speed motor which is susceptible to variable load conditions. Thus, the preceding description of the invention as applied to a blower of a furnace has been provided merely for the purpose of presenting a more complete illustration of the invention and its application and should not be considered as limited to that application or particular embodiment.

What is claimed is:

1. A method of controlling the power output of a variable speed motor operating to drive a device under variable load conditions comprising the steps of:
    (a) driving a representative device by operating said representative motor over a range of speeds and sensing parameters to determine the relationship of representative motor speed to work output of said representative device;
    (b) driving said representative device with said motor operating at maximum power conditions over a range of variable load conditions, and sensing parameters to determine the work outputs and the corresponding speeds and power outputs of said representative motor over said range;
    (c) establishing a particular power output limit for the motor;
    (d) using the above determinations to calculate the maximum allowable motor speeds corresponding to said power output limit over said range of variable load conditions;
    (e) sensing the actual speed of the variable speed motor driving the device under variable load conditions; and
    (f) limiting said actual speed to said maximum allowable motor speeds while operating within said range of variable load conditions.

2. A method as set forth in claim 1 wherein the variable speed motor is connected to drive a fan and the work output of the volume of air being moved over a period of time.

3. A method as set forth in claim 2 wherein the variable load conditions are expressed in terms of static pressure.

4. A method as set forth in claim 1 and including the steps of:
    (a) determining reference speeds expressed as a function of motor speeds and work output over said range of variable load conditions and
    (b) using these reference speeds in limiting the actual motor speeds.

5. A method as set forth in claim 4 and including the further steps of:
    (a) relating said reference speeds to said maximum allowable motor speeds and deriving an equation which expresses the maximum allowable motor speed as a function of said reference speed; and
    (b) using the equation in limiting the actual motor speed.

6. A method as set forth in claim 5 wherein said equation is a best fit straight line equation.

7. A method of limiting the power output of a variable speed motor which is applied to drive a fan comprising the steps of:
- (a) operating a representative motor and fan combination and sensing parameters to determine the volume flow rates of said representative fan as a function of said representative motor speeds;
- (b) operating said representative motor and fan combination and sensing parameters to determine, for various static pressure conditions of said representative fan, with said representative motor operating under maximum power conditions, the volume flow rate of said representative fan and the corresponding speeds and power outputs of said representative motor;
- (c) establishing a particular power output limit for the motor;
- (d) using the known fan law relationship of motor speed and power output, determining the maximum motor speeds corresponding to said power output limit for each of said various static pressure conditions;
- (e) using the volume flow rates and motor speeds obtained in step (a) and using the known fan law relationship of speed versus volume flow rate, determining reference speeds for each of said various static pressure conditions;
- (f) using the maximum motor speeds and the reference speeds obtained in respective steps (d) and (e), establishing a best fit straight line equation to express the maximum allowable motor speeds as a function of said reference speeds;
- (g) sensing the actual speed of the variable speed motor driving the fan; and
- (h) limiting said control speeds to said maximum allowable motor speeds found in step (f).

* * * * *